US012736676B2

(12) United States Patent
Wen et al.

(10) Patent No.: US 12,736,676 B2
(45) Date of Patent: Sep. 15, 2026

(54) SYSTEM AND METHOD OF CAPTURING LARGE SCALE SCENES USING WEARABLE INERTIAL MEASUREMENT DEVICES AND LIGHT DETECTION AND RANGING SENSORS

(71) Applicants: XIAMEN UNIVERSITY, Xiamen (CN); SHANGHAITECH UNIVERSITY, Shanghai (CN)

(72) Inventors: Chenglu Wen, Xiamen (CN); Yudi Dai, Xiamen (CN); Lan Xu, Shanghai (CN); Cheng Wang, Xiamen (CN); Jingyi Yu, Shanghai (CN)

(73) Assignees: Xiamen University, Xiamen (CN); Shanghaitech University, Shanghai (CN)

( * ) Notice: Subject to any disclaimer, the term of this patent is extended or adjusted under 35 U.S.C. 154(b) by 1057 days.

(21) Appl. No.: 17/884,406

(22) Filed: Aug. 9, 2022

(65) Prior Publication Data

US 2023/0273315 A1 Aug. 31, 2023

Related U.S. Application Data

(63) Continuation of application No. PCT/CN2022/079151, filed on Mar. 3, 2022.

(30) Foreign Application Priority Data

Feb. 25, 2022 (WO) ................ PCT/CN2022/078083

(51) Int. Cl.
*G01S 17/58* (2006.01)
*G01S 17/89* (2020.01)
*G06T 19/00* (2011.01)

(52) U.S. Cl.
CPC .............. *G01S 17/58* (2013.01); *G01S 17/89* (2013.01); *G06T 19/006* (2013.01)

(58) Field of Classification Search
CPC .......... G01S 17/58; G01S 17/89; G01S 17/42; G01S 17/88; G01S 17/86; G06T 19/006
See application file for complete search history.

(56) References Cited

U.S. PATENT DOCUMENTS 10,937,178 B1 3/2021 Srinivasan
11,537,819 B1 * 12/2022 Das ......................... G06F 18/24
(Continued)

FOREIGN PATENT DOCUMENTS

CN 110140099 A 8/2019
CN 110596683 A 12/2019
(Continued)

OTHER PUBLICATIONS

Brubaker, Marcus Anthony. Physical Models of Human Motion for Estimation and Scene Analysis. Diss. 2012. (Year: 2012).*
Patil, A.K.; Balasubramanyam, A.; Ryu, J.Y.; B N, P.K.; Chakravarthi, B.; Chai, Y.H. Fusion of Multiple Lidars and Inertial Sensors for the Real-Time Pose Tracking of Human Motion. Sensors 2020, 20, 5342. https://doi.org/10.3390/s20185342 (Year: 2020).*
PCT International Search Report and the Written Opinion mailed Nov. 10, 2022, issued in related International Application No. PCT/CN2022/078083 (9 pages).
(Continued)

*Primary Examiner* — Ross Varndell
*Assistant Examiner* — Rachel L Roberts
(74) *Attorney, Agent, or Firm* — Sheppard Mullin Richter & Hampton LLP

(57) ABSTRACT

Described herein are systems and methods of capturing motions of humans in a scene. A plurality of IMU devices and a LiDAR sensor are mounted on a human. IMU data is captured by the IMU devices and LiDAR data is captured by the LiDAR sensor. Motions of the human are estimated based on the IMU data and the LiDAR data. A three-dimensional scene map is built based on the LiDAR data. An optimization is performed to obtain optimized motions of the human and optimized scene map.

27 Claims, 11 Drawing Sheets

(56) References Cited

U.S. PATENT DOCUMENTS

| | | | | |
|---|---|---|---|---|
| 11,628,855 | B1 | 4/2023 | Pradhan et al. | |
| 2002/0025053 | A1* | 2/2002 | Lydecker | H04R 5/02 381/303 |
| 2018/0072313 | A1 | 3/2018 | Stenneth | |
| 2018/0204338 | A1* | 7/2018 | Narang | G06T 7/55 |
| 2018/0217663 | A1 | 8/2018 | Chandrasekhar et al. | |
| 2019/0163968 | A1 | 5/2019 | Hua et al. | |
| 2020/0160559 | A1 | 5/2020 | Urtasun et al. | |
| 2020/0183007 | A1 | 6/2020 | Nagashima | |
| 2020/0226785 | A1* | 7/2020 | Woods | G06T 19/006 |
| 2021/0299873 | A1 | 9/2021 | Badiozamani et al. | |
| 2022/0066459 | A1 | 3/2022 | Jain et al. | |
| 2022/0143467 | A1 | 5/2022 | Green | |
| 2022/0321343 | A1 | 10/2022 | Bahrami et al. | |

FOREIGN PATENT DOCUMENTS

| | | | |
|---|---|---|---|
| CN | 110873879 | A | 3/2020 |
| CN | 111665512 | A | 9/2020 |
| CN | 113466890 | A | 10/2020 |
| CN | 112923934 | A | 6/2021 |
| WO | 2020/087041 | A1 | 4/2020 |

OTHER PUBLICATIONS

Non-Final Office Action dated Sep. 10, 2024, issued in related U.S. Appl. No. 17/884,273 (21 pages).

Liuyuan Deng et al. (Fusing Geometrical and Visual Information via Superpoints for the Semantic Segmentation of 3D Road Scenes, 2020) ( Year: 2020).

David Griffiths et al. (A Review on Deep Learning Techniques for 3D Sensed Data Classification, 2019) (Year: 2019).

PCT International Search Report and the Written Opinion mailed Nov. 29, 2022, issued in related International Application No. PCT/CN2022/079151 (10 pages).

First Office Action and Search Report dated May 14, 2026, issued in Chinese Patent Application No. 202280006556.4, with English machine translation (28 pages).

Yudi Dai et al., "HSC4D: Human-centered 4D Scene Capture in Large-scale Indoor-outdoor Space Using Wearable IMUs and LiDAR," Proceedings of the IEEE/CVF Conference on Computer Vision and Pattern Recognition (CVPR), Jun. 2022, pp. 6792-6802.

* cited by examiner

320

362

| Method | HPS | HSC4D |
|---|---|---|
| Scene size | 300-1000 ($m^2$) | 1000-5000 ($m^2$) |
| Multi-story | × | √ |
| Vertical routes | × | √ |
| Outdoor scenes | √ | √ |
| pre-built map free | × | √ |

364

| Sequences | r = 0.6m l = 100 | Loss term | | | Scene cropping radius | | | Length of optimization | |
|---|---|---|---|---|---|---|---|---|---|
| | | w/o $\mathcal{L}_{cont}$ | w/o $\mathcal{L}_{sld}$ | w/o $\mathcal{L}_{smt}$ | $r = 0.4m$ | $r = 0.8m$ | $r = 1.0m$ | $l = 50$ | $l = 200$ |
| Road | 0.96/1.06 | +4.44/-0.03 | +0.01/+1.06 | -0.06/+0.43 | +0.02/+0.00 | -0.01/+0.00 | -0.01/+0.00 | -0.03/-0.06 | -0.02/-0.03 |
| Gym01 | 0.66/0.65 | +7.03/-0.06 | +0.02/+0.70 | -0.31/-0.05 | +0.02/+0.00 | -0.01/+0.00 | -0.01/-0.01 | +0.00/+0.00 | +0.01/+0.00 |
| Building01 | 0.80/1.20 | +5.47/-0.21 | +0.04/+0.77 | -0.10/-0.35 | +0.04/-0.12 | +0.02/-0.13 | +0.01/-0.13 | -0.03/-0.22 | +0.02/-0.13 |
| Building04 | 0.92/0.96 | +5.88/-0.04 | -0.04/+0.86 | -0.12/-0.40 | +0.03/+0.00 | -0.01/+0.00 | -0.02/+0.01 | -0.02/+0.01 | -0.01/+0.00 |

| CheckPoint | Distance to start | Baseline1 | Balseline2 | HSC4D |
|---|---|---|---|---|
| Building ($P_1$) | $35m$ | 65.96 | 8.14 | **7.01** |
| Building($P_2$) | $350m$ | 214.74 | 17.79 | **11.02** |
| Building($P_3$) | $480m$ | 331.84 | 24.45 | **18.11** |
| Road($P_{end}$) | $250m$ | 192.17 | 89.15 | **67.93** |

368

| Terrain | Sequences | Baseline1 | Baseline2 | HSC4D |
|---|---|---|---|---|
| | | $L_{cont}/L_{std}$ | $L_{cont}/L_{std}$ | $L_{cont}/L_{std}$ |
| Flat | Building01 | 2.35/**1.00** | 6.22/2.57 | **0.80**/1.20 |
| Flat | Building03 | 3.54/**0.80** | 4.13/2.26 | **0.64**/0.91 |
| Flat | Gym02 | 4.20/0.43 | 5.33/1.08 | **0.78/0.20** |
| Flat | Gym03 | 44.156/1.14 | 3.21/2.08 | **0.79/0.26** |
| Flat | Gym01 | 187.65/**0.56** | 7.88/1.72 | **0.66**/0.65 |
| Stairs | Building02 | 389.70/1.05 | 7.58/2.67 | **0.81/0.87** |
| Stairs | Building04 | 394.46/**0.89** | 6.80/3.09 | **0.92**/0.96 |
| Slope | Road | 445.39/**1.03** | 8.59/3.70 | **0.96**/1.06 |

FIGURE 3E

SYSTEM AND METHOD OF CAPTURING LARGE SCALE SCENES USING WEARABLE INERTIAL MEASUREMENT DEVICES AND LIGHT DETECTION AND RANGING SENSORS

CROSS REFERENCE TO RELATED APPLICATIONS

This application is a continuation application of International Patent Application No. PCT/CN2022/079151, filed Mar. 3, 2022, which claims benefits of and priority to International Patent Application No. PCT/CN2022/078083 filed Feb. 25, 2022 and entitled "SYSTEM AND METHOD OF CAPTURING THREE-DIMENSIONAL HUMAN MOTION CAPTURE WITH LIDAR." The above-referenced applications are incorporated by reference herein in their entirety.

TECHNICAL FIELD

The present inventions generally relate to capturing scenes. More particularly, the present inventions relate to a system and method of capturing human-centered four-dimensional scenes in large-scale spaces using wearable inertial measurement devices and light detection and ranging sensors.

BACKGROUND

Development of digital world is important because it can enrich people's lives by enabling augmented reality, virtual reality, smart city, robots, autonomous driving, etc. in the digital world. Humans and environments are two main components for creating the digital world. Current research tends to separate dynamic human motions from static environments to help improve capture accuracy of both the human motions and the environments. To capture human motions, inertial measurement unit (IMU) sensors are widely used and be mounted on different parts of human body, like arms, legs, feet, head, etc. The IMU sensors can capture accurate short-term motions but can suffer from drift with increasing acquisition time. Conventional methods tend to utilize external cameras as a remedy to improve accuracy, but these methods can result in limited capture space, human activities, and interactions. For example, Human POSEiting System (HPS) uses a head-mounted camera, which looks outwards like human eyes, to complement IMU sensors in global localization. Without constraints of external cameras, HPS can recover full-body pose and register the human wearing the HPS in large 3D scans of real scenes. However, the HPS requires pre-built maps and a large image database for self-localization, which are not ideal for capturing large scenes. As such, conventional methods are not ideally suited to capture scenes from large-scale spaces.

SUMMARY

Described herein is a method of capturing motions of humans in a scene. A plurality of IMU devices and a LiDAR sensor can be mounted on a human. IMU data can be captured by the IMU devices and LiDAR data can be captured by the LiDAR sensor. Motions of the human can be estimated based on the IMU data and the LiDAR data. A three-dimensional scene map can be built based on the LiDAR data. An optimization can be performed to obtain optimized motions of the human and optimized scene map.

In some embodiments, ego-motions of the LiDAR sensor can be estimated. The LiDAR sensor can be mounted on a hip of the human.

In some embodiments, the LiDAR data and the IMU data can be calibrated based on the ego-motion of the LiDAR sensor.

In some embodiments, jumping by the human can be captured during the step of obtaining IMU data captured by the IMU devices and the LiDAR data captured by the LiDAR sensor. The LiDAR data and the IMU data can be synchronized based on a peak derived from the LiDAR data and a peak derived from the IMU data.

In some embodiments, a graph-based optimization can be performed to fuse a LiDAR trajectory and an IMU trajectory. The LiDAR trajectory can comprise a movement of a center of the human derived from the LiDAR data. The IMU trajectory can comprise a movement of a center of the human derived from the IMU data.

In some embodiments, the optimization can be based on a contact constraint and a sliding constraint.

In some embodiments, the contact constraint can define a contact loss as a distance from a body part derived from the motions of the human to a nearest surface derived from the three-dimensional scene map. The sliding constraint can define a sliding loss as a distance between two successive body parts derived from the motions of the human. A sum of the contact loss and the sliding loss can be minimized with a gradient descent algorithm to iteratively optimize the motions of the human.

In some embodiments, the body part can be a foot of the human. The surface can be a ground.

In some embodiments, a plurality of second IMU devices and a second LiDAR sensor can be mounted on a second human. Second IMU data captured by the second IMU devices and second LiDAR data captured by the second LiDAR sensor can be obtained. Motions of the second human can be estimated based on the second IMU data. A three-dimensional second scene map can be built based on the second LiDAR data. The three-dimensional scene map and the three-dimensional second scene map can be fused to obtain a combined scene map.

In some embodiments, a metaverse can be created based on the optimized motions of the human and the optimized scene map.

Described herein is a system for capturing motion. The system can comprise a plurality of IMU devices to be worn by a human, a LiDAR sensor to be mounted on the human, a processor, and a memory storing instructions that, when executed by the processor, cause the system to perform a method for capturing motions of humans in a scene comprising: obtaining IMU data captured by the IMU devices and LiDAR data captured by the LiDAR sensor.

In some embodiments, a L-shaped bracket can be configured to mount the LiDAR sensor on a hip of the human. The LiDAR sensor and the IMU devices can be configured to have a substantially rigid transformation.

In some embodiments, a wireless receiver can be coupled to the system. The wireless receiver can be configured to receive the IMU data captured by the IMU devices.

In some embodiments, motions of the human can be estimated based on the IMU data and the LiDAR data. A three-dimensional scene map can be built based on the LiDAR data. An optimization can be performed to obtain optimized motions of the human and an optimized scene map.

In some embodiments, a graph-based optimization can be performed to fuse an LiDAR trajectory and an IMU trajectory. The LiDAR trajectory can comprise a movement of a center of the human derived from the LiDAR data. The IMU trajectory can comprise a movement of a center of the human derived from the IMU data.

In some embodiments, the optimization can be based on a contact constraint and a sliding constraint.

In some embodiments, the contact constraint can define a contact loss as a distance from a body part derived from the motions of the human to a nearest surface derived from the three-dimensional scene map. The sliding constraint can define a sliding loss as a distance between two successive body parts derived from the motions of the human. A sum of the contact loss and the sliding loss can be minimized with a gradient descent algorithm to iteratively optimize the motions of the human.

In some embodiments, the body part can be a foot of the human. The surface can be a ground.

In some embodiments, a plurality of second IMU devices can be configured to be worn by a second human. A second LiDAR sensor can be configured to be mounted on the second human. Second IMU data captured by the second IMU devices and second LiDAR data captured by the second LiDAR sensor can be obtained. Motions of the second human can be estimated based on the second IMU data. a three-dimensional second scene map can be built based on the second LiDAR data. The three-dimensional scene map and the three-dimensional second scene map can be fused to obtain a combined scene map. An optimization can be performed to obtain optimized motions of the human and the second human in an optimized combined scene map.

In some embodiments, a metaverse can be created based on the optimized motions of the human and the optimized scene map.

Described herein is a method of optimizing motions of humans in a scene. A three-dimensional scene map and motions of a human can be obtained. A graph-based optimization can be performed to fuse an LiDAR trajectory and an IMU trajectory. A joint optimization can be performed based on a plurality of physical constraints to obtain optimized motions of the human and an optimized scene map.

In some embodiments, the three-dimensional scene map can be obtained from LiDAR data captured by a LiDAR sensor mounted on the human. The motions of the human can be obtained from IMU data captured by a plurality of IMU devices mounted on the human.

In some embodiments, the three-dimensional scene map and the motions of the human can be calibrated.

In some embodiments, the three-dimensional scene map and the motion of the human can be synchronized.

In some embodiments, the LiDAR trajectory can comprise a movement of a center of the human derived from the LiDAR data. The IMU trajectory can comprise a movement of a center of the human derived from the IMU data.

In some embodiments, the joint optimization can be based on a contact constraint and a sliding constraint.

In some embodiments, the contact constraint can define a contact loss as a distance from a body part derived from the motions of the human to a nearest surface derived from the three-dimensional scene map. The sliding constraint can define a sliding loss as a distance between two successive body parts derived from the motions of the human. A sum of the contact loss and the sliding loss can be minimized with a gradient descent algorithm to iteratively optimize the motions of the human.

In some embodiments, the body part can be a foot of the human, and the surface can be a ground.

In some embodiments, a plurality of second IMU devices and a second LiDAR sensor can be mounted on a second human. Second IMU data captured by the second IMU devices and second LiDAR data captured by the second LiDAR sensor can be obtained. Motions of the second human can be estimated based on the second IMU data. A three-dimensional second scene map can be built based on the second LiDAR data. The three-dimensional scene map and the three-dimensional second scene map can be fused to obtain a combined scene map. An optimization can be performed to obtain optimized motions of the human and the second human in an optimized combined scene map.

In some embodiments, a metaverse can be created based on the optimized motions of the human and the optimized scene map.

These and other features of the apparatuses, systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 3D-3E illustrate various comparison tables comparing the HSC4D dataset with other datasets, according to various embodiments of the present disclosure.

Figure 1:
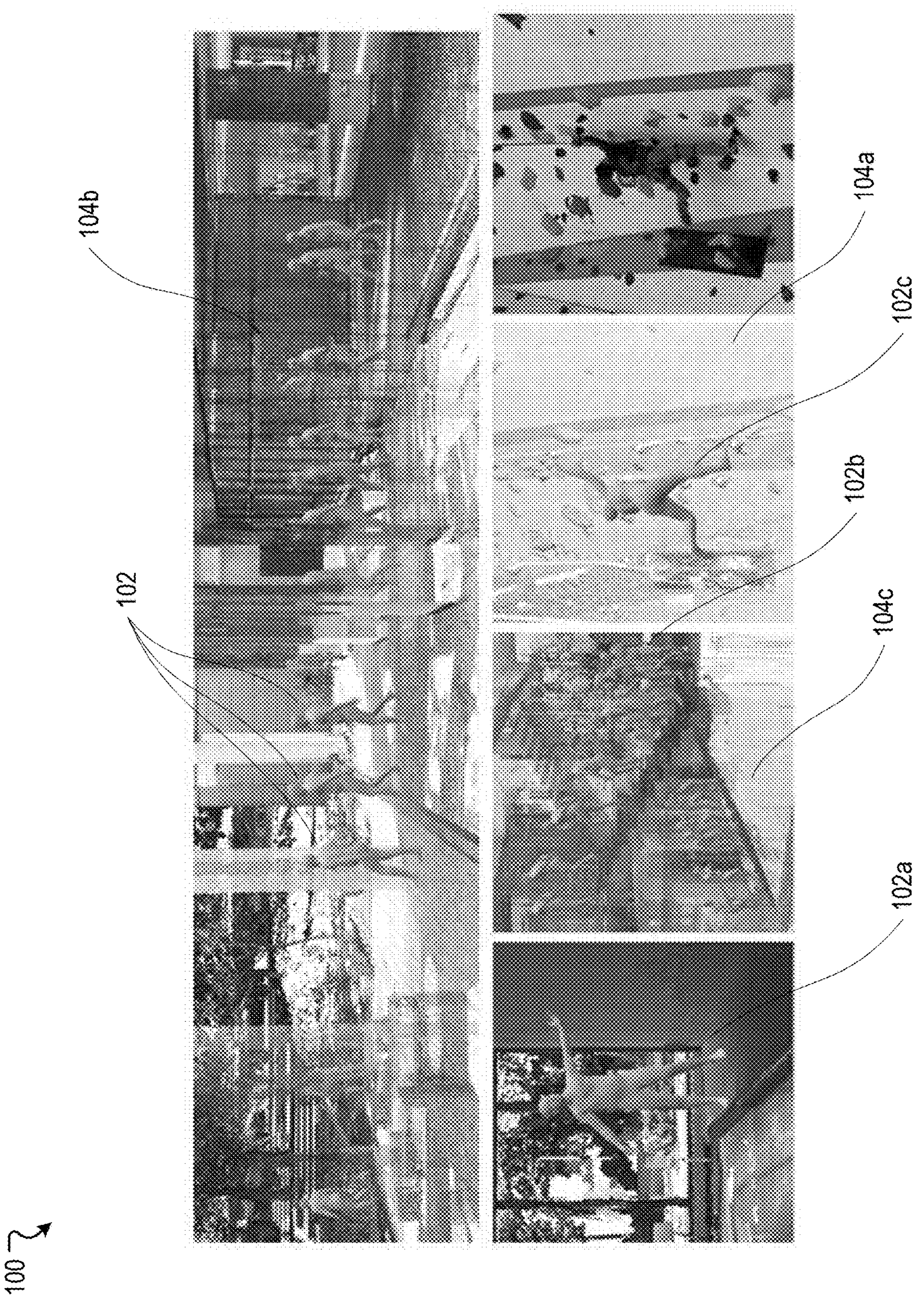
FIG. 1 illustrates various human motions and large scale indoor and outdoor scenes captured using a motion and scene capturing system, according to various embodiments of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

For accurate localization and mapping, a light detection and ranging (LiDAR) sensor is the most applicable sensor. LiDAR sensors are popular and extensively used in mobile robotics and autonomous vehicle applications. LiDAR sensors are also extensively used for large-scale scene captures. Although there are many LiDAR-captured datasets, including indoor scenes and large-scale outdoor scenes, these datasets generally focus on scene understanding and 3D perception, while ignoring accurate human poses. For example, a PedX dataset provides 3D poses of pedestrians by using skinned multi-person linear model (SMPL) parameterization for joint locations of instances (e.g., objects, humans) on third-person-view images. The 3D poses of the PedX dataset are not accurate as poses measured by IMU sensors. Furthermore, the PedX dataset focuses on traffic scenes and, thus, is not applicable for generating diverse 3D human motions.

Described herein are inventions that address the problems described above. In various embodiments, the inventions can comprise a motion and scene capturing system. The motion and scene capturing system can comprise a plurality of IMU sensors and a LiDAR sensor. The plurality of IMU sensors and the LiDAR sensor can be worn by a human to capture human motion while simultaneously providing localization and scene capture. By taking advantage of IMU-based motion caption and LiDAR-based localization and scene capture, a dataset, namely a Human-centered 4D Scene Capture (HSC4D) dataset, can be generated to accurately and efficiently create a dynamic digital world with consecutive human motions in indoor-outdoor scenes. Using only body-mounted sensors, the HSC4D dataset is not limited or dependent on particular spaces, poses, interactions between humans, or environments. Further, the HSC4D dataset makes it possible to capture most of human-involved real-world scenes. Compared with camera-based localization, LiDAR-based localization is more precise for global localization, which can dramatically reduce drifts of IMU sensors. Further, unlike camera-based localization, LiDAR-based localization does not need pre-built maps. Moreover, IMU sensors can improve accuracy of LiDAR-captured local trajectories, where errors are caused by body jitters. As such, making use of both IMU sensors and a LiDAR sensor, a joint optimization can be performed to improve performance of motion estimation and human-scene mapping by considering several physical constraints. The inventions described herein use only body-mounted IMU and LiDAR sensors. Therefore, unlike conventional methods, capturing human motions and large scale scenes are not limited by devices' constraints and any pre-built maps, thereby achieving long-term human motion capture. In some cases, depending on battery capacity powering the body-mounted IMU and LiDAR sensor, the time for motion capture can last more than an hour. In some embodiments, to perform human subject localization, the LiDAR sensor can be designed as backpacked and hand-held. Because LiDAR-based localization systems are usually not portable, and thereby affecting human motion capture, a lightweight hip-mounted LiDAR sensor is designed to rigidly connect to human body. In this way, human self-localization can be achieved in both large indoor and outdoor scenes. In some embodiments, to make the motion and scene capturing system lighter and be able to communicate wirelessly, a LiDAR-only method for localization and mapping in scenes is disclosed herein. In such embodiments, joint optimization results with the scenes and IMU poses can further improve LiDAR mapping results. Based on the inventions disclosed herein, a metaverse can be created based on optimized human motions and optimized scenes. These and other features of the inventions are described in further detail herein.

FIG. 1 illustrates various human motions and large scale indoor and outdoor scenes captured using a motion and scene capturing system, according to various embodiments of the present disclosure. In accordance with various embodiments, a dataset (i.e., HSC4D) 100 containing large scenes ranging from 1 k-5 k $m^2$ with accurate dynamic human motions 102 and locations 104 can be generated using IMU sensors and a LiDAR sensor of the motion and scene capturing system. For example, as shown in FIG. 1, the dataset contains diverse scenarios, like a climbing gym **104*a*, multi-story building 104*b*, indoor stairs 104*c*, etc., and challenging human activities, such as exercising 102*a*, walking up/down stairs 102*b*, climbing 102*c*, etc. As can be seen from FIG. 1, accurate human poses and natural interactions between human activities (e.g., 102*a*-102*c*) and environments (e.g., 104*a*-104*c***) can be effectively captured. Further, effectiveness and generalization ability of the dataset are demonstrated.

The motion and scene capturing system can be configured to estimate 3D human motions using a LiDAR sensor, such as a 3D spinning LiDAR, and IMU sensors in a large unknown scene and build a map for the large unknown scene, where the estimated 3D human motions can include data relating to local 3D poses and global localization. In general, N frames of the estimated 3D human motion can be represented as $M=(T, \theta, \beta)$, where T is the N×3 translation parameter, $\theta$ is the N×24×3 pose parameter, and $\beta$ is the N×10 shape parameter. During motion capturing, it can be assumed that $\beta$ is constant. A 3D point cloud scene captured by the LiDAR sensor can be represented as S. A subscript k, $k \in Z^+$ is to indicate an index of a point cloud frame. A Skinned Multi-Person Linear (SMPL) body model $\Phi(\bullet)$ can be used to map $M_k$ to human mesh models $V_k$, $V_k \in R^{6890\times 3}$. In general, data captured using the LiDAR sensor and IMU sensors can have three coordinate systems: a IMU coordinate system, a LiDAR coordinate system, and a global coordinate system. In the IMU coordinate system, {I}, an origin of this coordinate system is set at the hip joint of a SMPL model representing a human, and X/Y/Z axes are pointing to the right/upward/forward directions of the human, respectively. In the LiDAR coordinate system, {L}, an origin of this coordinate system is set at the center of the LiDAR sensor, and X/Y/Z axes are pointing to the right/forward/upward directions of the LiDAR sensor, respectively. In the global coordinate system, {W}, coordinates are set to be the same as coordinates of a first point cloud frame captured by the LiDAR sensor. In general, tasks to be performed by the motion and scene capturing system can be defined as follows: given a sequence of LiDAR sweeps (i.e., point cloud frames)

$$P_k^L, k \in Z^+$$

in {L} (i.e., the LiDAR coordinate system) and a sequence of 3D Human motions $$M_k^I$$

in {I} (i.e., the IMU coordinate system), compute a human motion $$M_k^w$$

in {W} (i.e., the global coordinate system) and build a 3D scene S with $$P_k^I.$$

Figure 2:
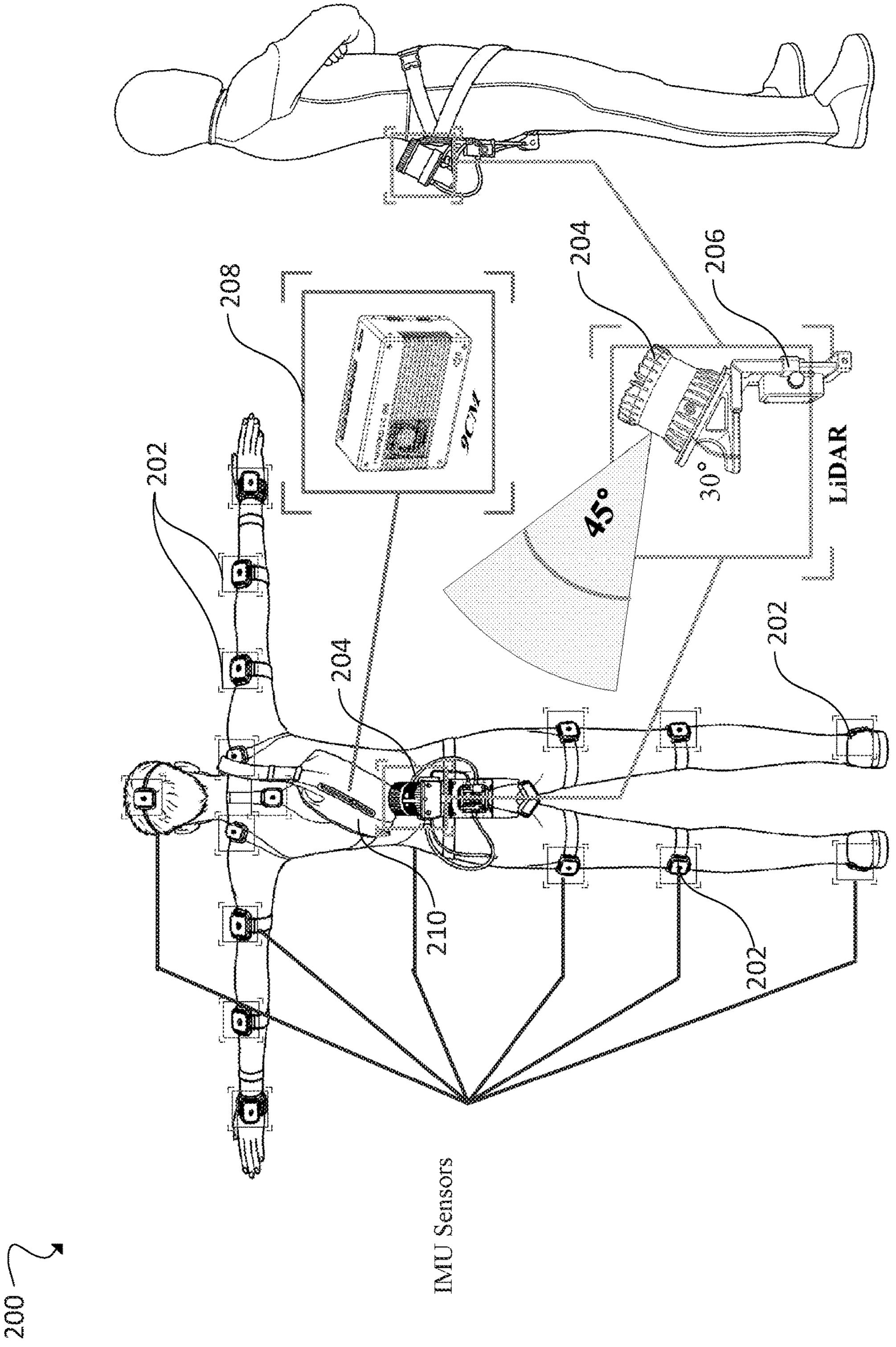
FIG. 2 illustrates a motion and scene capturing system, according to various embodiments of the present disclosure.

FIG. 2 illustrates a motion and scene capturing system 200, according to various embodiments of the present disclosure. As shown in FIG. 2, in some embodiments, the motion and scene capturing system 200 can comprise a plurality of IMU sensors 202 and a LiDAR sensor 204. The plurality of IMU sensors 202 and the LiDAR sensor 202 can be mounted or be worn by a human. In some implementations, the plurality of IMU sensors 202 can be embedded into clothing worn by the human. In other implementations, the plurality of IMU sensors can be embedded into straps that can be worn by the human, such as IMU sensors measuring knee motions of the humans shown in FIG. 2. In some implementations, the LiDAR sensor 204 can be mount near the hip of the human on a specialized plate 206 can be worn by the human. In some embodiments, the LiDAR sensor 204 can be a 64-beams Ouster LiDAR sensor and the plurality of IMU sensors 202 can be Noitom's inertial MoCap product PN Studio. The LiDAR sensor 204 can be configured to acquire 3D point clouds, $$P_k^L,$$

and the plurality of IMU sensors 202 can be configured to obtain human motion, $$M_k^I.$$

As shown in FIG. 2, in some embodiments, the plurality of IMU sensors can comprise 17 IMU sensors that can be attached to or associated with various body limbs of the human. In some embodiments, the plurality of IMU sensors 202 can with associated with a receiver. The receiver can be configured to acquire human motion data captured by the plurality of IMU sensors 202. In some embodiments, the receiver can be configured to be physically coupled to the plurality of IMU sensors 202. For example, the receiver can be connected to each of the plurality of IMU sensors 202 via data cables. In some embodiments, the receiver can be configured to be wirelessly coupled to the plurality of IMU sensors 202. For example, the receiver can wirelessly communicate with the plurality of IMU sensors 202 via Wi-Fi, Bluetooth, near-field communication, or other suitable types of wireless communication technology. In some embodiments, to make the LiDAR sensor 204 work wirelessly, the LiDAR sensor 204 can be connected to a computing system 208, such as a DJI Manifold2-C mini-computer. In some embodiments, the computing system 208 can be portable and can be powered by a 24V mobile energy storage device, such as a battery, to power the LiDAR sensor 204 and the computing system 208. In some embodiments, to ensure the motion and scene capturing system is lightweight and precise, cablings associated with the LiDAR sensor 204 can be modified and routed to the specialized plate 206. In some embodiments, the specialized plate can be a custom designed 10 cm×10 cm L-shape bracket that is utilized to mount the LiDAR sensor 204. In some embodiments, the battery and the computing system 208 can be stored in a small enclosure 210 (e.g., a pouch, a bag, etc.) that can be worn on the human's back. The LiDAR sensor 204 can be worn tightly close to the hip of the human, thereby making the origins of {I} and {L} as close as possible. In this way, point cloud data captured by the LiDAR sensor 204 and human motion data captured by the plurality of IMU sensors 202 can be approximately rigidly transformed to same coordinate system. In some embodiments, as shown in FIG. 2, the LiDAR sensor 204 can have a 360° horizon field of view and a 45° vertical field of view. However, in such embodiments, due to occlusions caused by back and swing arms of the human, the horizon field of view is reduced from a range of 360° to a range between 150° to 200°. Furthermore, in such embodiments, to avoid laser beams emitted from the LiDAR sensor 204 hitting nearby ground, the LiDAR sensor 204 is tilted up 30° on the specialized plate 206 to get a good vertical scanning view. In some embodiments, the motion and scene capturing system 200 can be worn by multiple humans to obtain 3D human motion data and point cloud data. For example, a first human can wear the motion and scene capturing system 200 to capture 3D human motion of the first human and to capture an environment surveyed by the first human. In this example, a second person can also wear the motion and scene capturing system 200 and survey the same environment. In this example, data obtained by the first human and data obtained by the second human can be jointly optimized through a data processing pipeline. The data processing pipeline will be discussed in further detail with reference to FIG. 3A herein.

Figure 3A:
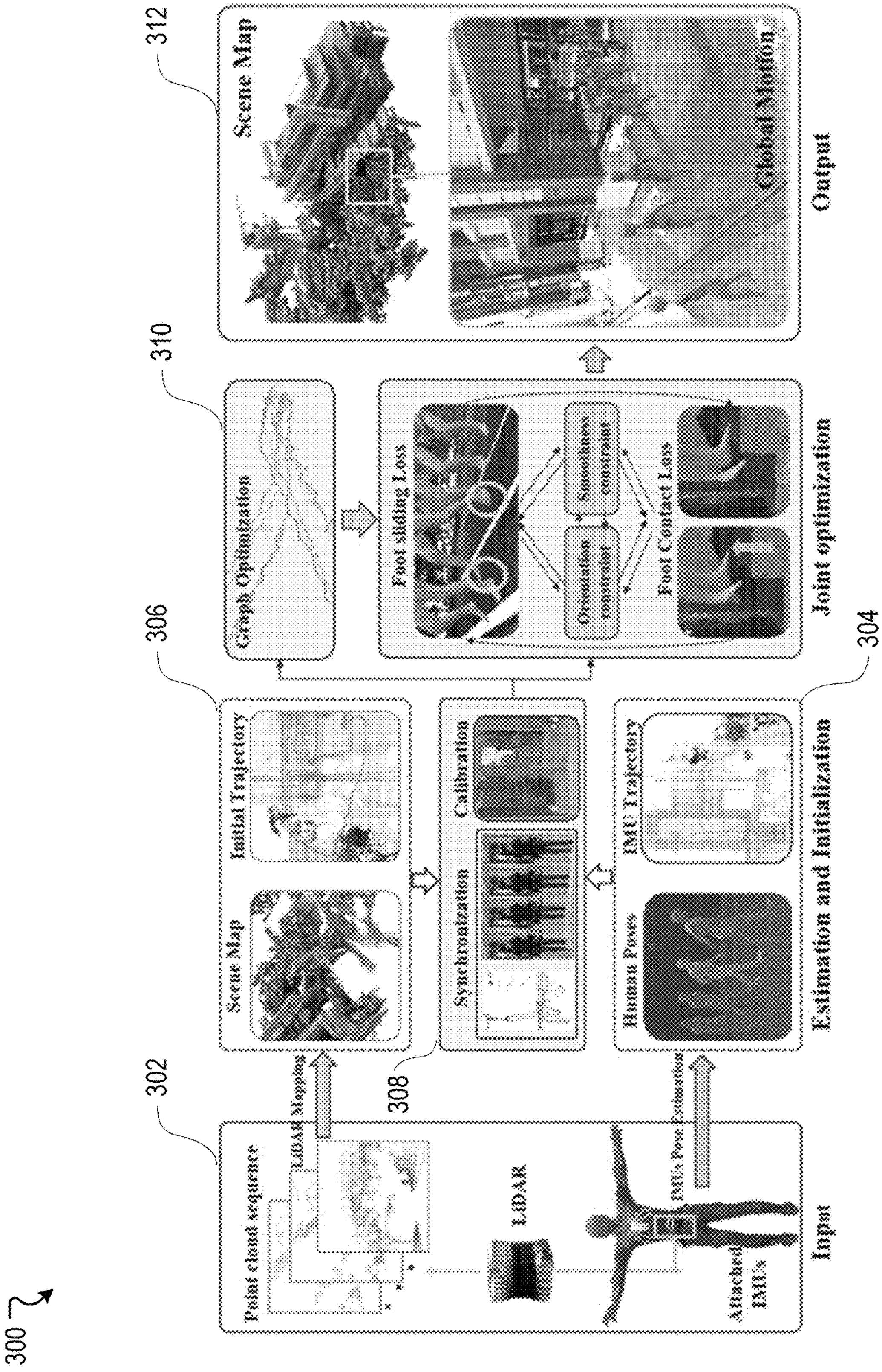
FIG. 3A illustrates a data processing pipeline to determine pose estimation and LiDAR mapping based on data captured by the motion and scene capturing system, according to various embodiments of the present disclosure.

FIG. 3A illustrates a data processing pipeline 300 to determine pose estimation and LiDAR mapping based on data captured by the motion and scene capturing system 200, according to various embodiments of the present disclosure. As shown in FIG. 3, 3D human motion data output by the plurality of IMU sensors 202 and point cloud data outputted by the LiDAR sensor 204 can be obtained by the computing system 208 (e.g., 302 of FIG. 3A). Based on the 3D human motion, ego-motions of the LiDAR sensor 204 can be estimated (e.g., 304 of FIG. 3A). Based on the point cloud data, a 3D scene map S can be built (e.g., 306 of FIG. 3A). A data initialization can be performed to prepare the point cloud data for further optimization (e.g., 308 of FIG. 3A). A graph-based optimization can be performed to fuse LiDAR trajectories determined based on the 3D scene map and IMU trajectories determined based on the 3D human motion (e.g., 310 of FIG. 3A). Finally, by combining the point cloud data, the 3D human motion data, and the 3D scene, a joint optimization can be performed to generate human motions M and an optimized scene (e.g., 312 of FIG. 3A).

In some embodiments, the data processing pipeline 300 can perform IMU pose estimation. The data processing pipeline 300 can estimate the human motion M in the IMU coordinate {I} as follows: $M^I=(T^I, \theta^I, \beta)$, where $T^I$ and $\theta^I$ are provided by the plurality of IMU sensors 202. Pose parameter $\theta^I$ is composed of the hip joint's orientation $R^I$ relative to a start point cloud frame and other joints' rotation relative to their parent joints.

$$T_k^I$$

indicates the k-th frame translation relative to the start point cloud frame. Since the 3D human motion data captured by the plurality of IMU sensors is accurate in a short period, the relative value of $T^I$ and $R^I$ can be used for optimization.

In some embodiments, the data processing pipeline 300 can perform LiDAR localization and mapping. In general, building the 3D map using the point cloud data is challenging because of LiDAR jitters caused by human motion, such as walking, and occlusions caused by human body blocking the field of view of the LiDAR sensor 204. As such, by employing LiDAR-based SLAM methods, the ego-motions of the LiDAR sensor 204 can be estimated and the 3D scene map S can be built with the point cloud data $$P_k^L, k \in Z^+$$

in {L}. Planner and edge feature points in the point cloud data can be extracted for every LiDAR point cloud frame $$P_k^L$$

and be used to update a feature map. Frame to frame odometry can be skipped and only frame to map registration is performed because the mapping process can run offline. Finally, the ego-motion $T^W$ and $R^W$ of the LiDAR sensor 204 and the 3D scene map S are computed. The mapping function can be expressed as:

$$T^W, R^W, S = \mathcal{F}(P_{1:N}^L)$$

In some embodiments, the data processing pipeline 300 can perform coordinate calibration. To obtain rigid offsets from the point cloud data captured by the LiDAR sensor 204 to the 3D human motion captured by the plurality of IMU sensors 202 and to make coordinate systems of the point cloud data and the 3D motion data aligned, following steps are performed by the data processing pipeline 300: First, the human stands as an A-pose in a starting position in a scene before capture, and the human's face direction is registered as Y-axis direction of the scene. After capturing, point cloud data of the scene is rotated to the Z-axis of the scene perpendicular to ground of the starting position. The scene is then translated so that an origin of the scene matches an origin of a SMPL model corresponding to the human standing on the ground. The ego motion $T^W$ and $R^W$ of the LiDAR sensor 204 are then translated and rotated in accordance with the scene. The point cloud data is calibrated to {W}. The pitch, roll, and translation of the 3D human motion are calibrated to the global coordinate system.

In some embodiments, the data processing pipeline 300 can perform time synchronization. In some embodiments, data captured from the LiDAR sensor 204 and the plurality of IMU sensors 202 can be synchronized according to timestamps of peaks in both $T^W$ and $T^I$ based on their z values. These peaks are generated when, during motion captures, the human jumps from the standing position. In some embodiments, the 3D human motion captured by the plurality of IMU sensors 202 (100 Hz) can be resampled to the same frame rate as the point cloud data captured by the LiDAR sensor 204 (20 Hz).

Figure 3B:
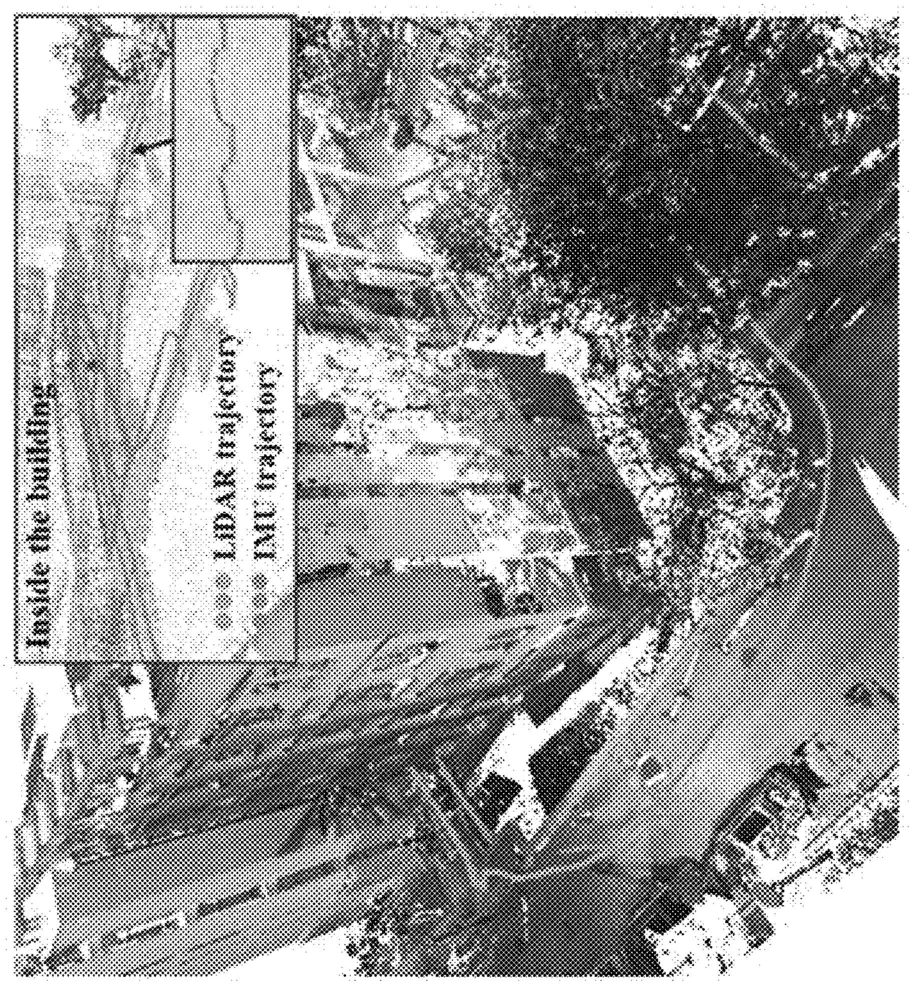
FIG. 3B illustrates a comparison of the IMU trajectory and the LiDAR trajectory, according to various embodiments of the present disclosure.

In some embodiments, the data processing pipeline 300 can perform graph optimization data fusion. For example, FIG. 3B illustrates a comparison 320 of the IMU trajectory and the LiDAR trajectory, according to various embodiments of the present disclosure. In general, the IMU trajectory is a movement of a center of the human derived from the 3D human motion data, while the LiDAR trajectory is a movement of the center of human derived from the point cloud data, which is rotated and translated from a center of the LiDAR sensor. As can be seen from FIG. 3B, the 3D human motion data can drift significantly over time and fails when a height of a scene changes, while the point cloud data localizes correctly but jitters at local movements. As such, to estimate a smoother and more stable trajectory, both data's advantages are utilized. The data processing pipeline 300 can estimate the trajectory as follows: 1) first, mark a point cloud frame in $T^W$ that exceeds an IMU velocity resulting from multiplying a coefficient to a local fitted value as outliers, 2) treat remaining ($R^W$, $T^W$) as landmarks, then segment $T^I$ into multiple sequences according to the landmarks, 3) align $T^I$ to $T^W$ based on constraints of the landmarks, and 4) perform graph optimization to couple $T^I$ and $T^W$.

In some embodiments, the data processing pipeline 300 can perform joint optimization. To obtain accurate and scene-natural human motion $M=(T,\theta)$, and a higher quality point cloud data of a scene S, the data processing pipeline 300 can perform a joint optimization by using the point cloud data of the scene S and physics constraints. The optimized human motion and the point cloud data T are sent back to a mapping function F as an initial value to create a new scene $S_{opt}$. In one particular implementation, four constraints can be used to make the transition from the scene to the new scene. These four constraints can include a foot contact constraint $L_{cont}$ encouraging a human standing on ground, a sliding constraint $L_{sld}$ eliminating a human walk sliding, an orientation constraint $L_{ort}$ from $R^I$ making rotations smooth, and a smoothness constraint $L_{smt}$ making a translation smooth. The optimization can be expressed as follows:

$$\mathcal{L} = \lambda_{cont}\mathcal{L}_{cont} + \lambda_{sld}\mathcal{L}_{sld} + \lambda_{ort}\mathcal{L}_{ort} + \lambda_{smt}\mathcal{L}_{smt}$$

$$M = \underset{M}{\operatorname{argmin}}\mathcal{L}(M \mid T^I, \theta^I, R^W, S)$$

$$S_{opt} = F(P_{1:N}^L, M),$$

where $\lambda_{cont}$, $\lambda_{sld}$, $\lambda_{ort}$, $\lambda_{smt}$ are coefficients of loss terms. $\mathcal{L}$ is minimized with a gradient descent algorithm to iterative optimize $M^{(i)}=(T^{(i)},\theta^{(i)})$, where (i) indicates the iteration. $M^{(0)}$ is set as $(T^W, \theta^I)$.

In some embodiments, the data processing pipeline 300 can perform plane detection. In plane detection, to improve validity of foot contact, planes near the human are detected. In some embodiments, Cloth Simulation Filter (CSF) can be used to extract ground points $S_g$ in S. And then neighboring points of $T^W$ can be searched in $S_g$. Unlike a method based on a dense mesh model, discrete point clouds have empty areas, which can result in invalid foot contact constraints. To address this, RANSAC can be used to fit planes for the neighboring points. The plane function can be denoted as $p_k$.

In some embodiments, the data processing pipeline 300 can determine a foot contact constraint. A foot contact loss can be defined as a distance from a stable foot to its nearest ground. Unlike HPS, which requires knowing information about which foot is stepping on a floor, the current method detects foot states based on movements. First, the left and right foot movement can be compared for every successive foot vertices in $$V_k^I = \Phi(T_k^I, \theta_k^I, \beta)$$

based on 3D human data captured by the plurality of IMU sensors 202. In the current method, one foot is marked as a stable foot if its movement is smaller than 2 cm and smaller than the other foot's movement. The k-th frame's stable foot vertices index list in is written as $V_j$ is denoted as $S_k$ and the foot contact loss $\mathcal{L}_{cont}$ can be expressed as follows:

$$\mathcal{L}_{cont} = \frac{1}{l}\sum_{j=k}^{k+l} \sum_{v_c \in V_j^{S_j}} \frac{1}{|S_j|} \|v_c - \tilde{v}_c p_j\|_2,$$

where $\tilde{v}_c$ is homogeneous coordinate of $v_c$.

$$V_j^{S_j}$$

is denoted as $S_j$ foot vertices in $V_j=\Phi(M_j)$, which is from the 3D human motion to be optimized.

In some embodiments, the data processing pipeline 300 can determine a foot sliding constraint. The foot sliding constraint can reduce the 3D human motion's sliding on the ground, thereby making the 3d human motion more natural and smooth. The sliding loss can be defined as every two successive stable foot's distance. The sliding loss can be expressed as follows:

$$\mathcal{L}_{slid} = \frac{1}{l}\sum_{j=k}^{k+l-1} \left\|\mathbb{E}\left(V_{j+1}^{S_{j+\lambda}}\right) - \mathbb{E}\left(V_j^{S_{j+1}}\right)\right\|_2,$$

where $\mathbb{E}(\cdot)$ is the average function.

In some embodiments, the data processing pipeline 300 can determine an orientation constraint. The orientation constraint can enable the 3D human motion M to rotate as smoothly as IMU and have the same orientation with landmarks $\mathcal{A}$ previously described. The orientation loss can be expressed as follows:

$$\mathcal{L}_{orit} = \frac{1}{|A|}\sum_{j \in A} \|(R_j)^{-1} R_j^W\|_2 + \frac{1}{l-1}\sum_{j=k}^{k+l-1} \max\left(0, \|(R_j)^{-1} R_{j+1}\|_2 - \|(R_j^I)^{-1} R_{j+1}^I\|_2\right),$$

In some embodiments, the data processing pipeline 300 can determine a smooth constraint. The smooth constraint can enable the 3D human motion to move as smoothly as IMU motion, thereby minimizing differences of translation distance between the LiDAR sensor 204 and the plurality of IMU sensors 202. The smooth loss term can be expressed as follows:

$$\mathcal{L}_{sint} = \frac{1}{l}\sum_{j=k}^{k+l-1} \max\left(0, \|T_k - T_{k+1}\|_2 - \|T_{k+1}^I - T_k^I\|_2\right).$$

Figure 3C:
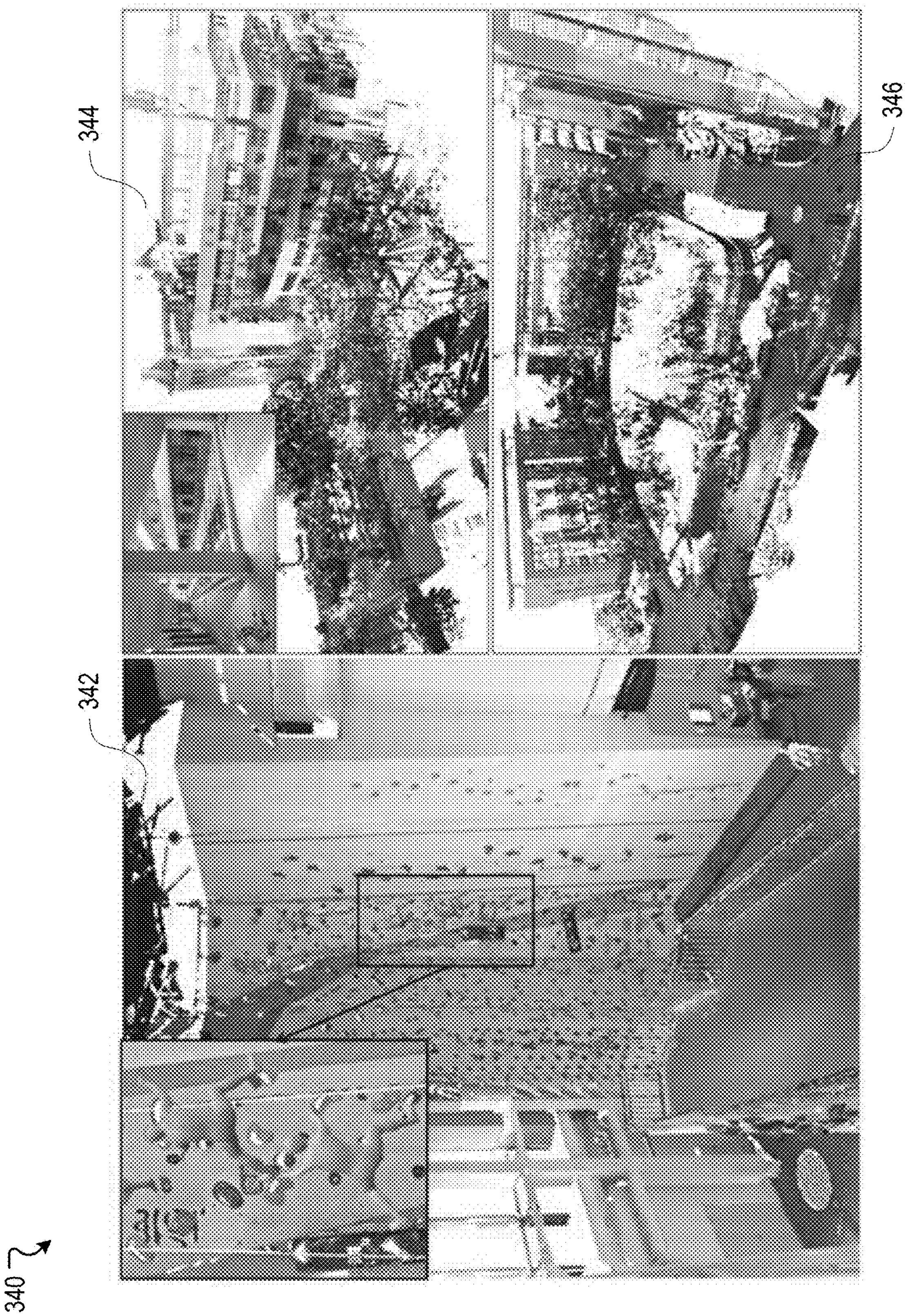
FIG. 3C illustrates an example HSC4D dataset, according to various embodiments of the present disclosure.

In general, the dataset (i.e., the HSC4D data) disclosed herein can be evaluated in large indoor-outdoor 3D scenes. Results of these evaluations demonstrate the effectiveness and the generalization ability of the HSC4D dataset. For example, FIG. 3C illustrates an example HSC4D dataset 340, according to various embodiments of the present disclosure. As shown in FIG. 3C, the example HSC4D dataset 340 can include three large scenes: a rock climbing gym 342, a multi-story building 344, and an outdoor closed-loop road 346. The rock climbing gym 342 has a wall height of 20 meters, with a ground and climbing area size over 1200 $m^2$. The multi-story building includes a scene with an indoor and outdoor area size of up to 5000 $m^2$. This scene has a diversity of heights and environments, including a multi-story structure, slopes, and staircases. The outdoor closed-loop road 346 is 70 m×65 m with slops. In these scenes, captured 3D human activities can include walking, exercising, walking up/down stairs, rock climbing, etc. Since a 3D map generated from a LiDAR is rough and lacks color information, a Terrestrial Laser Scanner (TLS) can be used to scan the scenes in color for better visualization. In various embodiments, the HSC4D dataset can provide 250K IMU human motion frames (100 Hz), 50 k time-synchronized LiDAR point cloud frames (20 Hz), various SLAM results, and colored ground truth point clouds of the scenes.

FIGS. 3D-3E illustrate various comparison tables comparing the HSC4D dataset with other datasets, according to various embodiments of the present disclosure. Table 362 shows a comparison between the HSC4D dataset and the HPS dataset. As can be seen in table 366, the HSC4D dataset has many advantages over the HPS dataset. Table 364 shows a quantitative evaluation of the HSC4D dataset. In this table, $\mathcal{L}_{cont}$ and $\mathcal{L}_{sld}$ in four sequences are shown in column two, loss terms ablating comparisons are shown in columns 3-5, an analysis of neighborhood radius r for cropping scenes is shown in columns 6-8. an analysis of an optimization sequence length l is shown in columns 9-10. Table 366 shows a global localization error comparison between baselines and the HSC4D dataset. Baseline1 depicts IMU results. Baseline2 depicts IMU pose+LiDAR localization. In this table, error is measured as distance (cm) from a selected CheckPoint (CP) to the SMPL model's foot. Table 368 shows local pose error comparison between baselines and the HSC4D dataset. $\mathcal{L}_{cont}$ is a mean foot contact distance error (cm) to the nearest ground. $\mathcal{L}_{sld}$ is a mean foot sliding distance error (cm) between two successive foot parts on the ground. Building01/03: 1.5 min/1 min sequence on the second/first floor's corridor. Building02/04: 3 min/1 min outdoor sequences, including stairs and slope. Gym01/02/03: three one-minute walking and warming up sequences. Road: 3.5 minutes walking sequence.

Figure 3F:
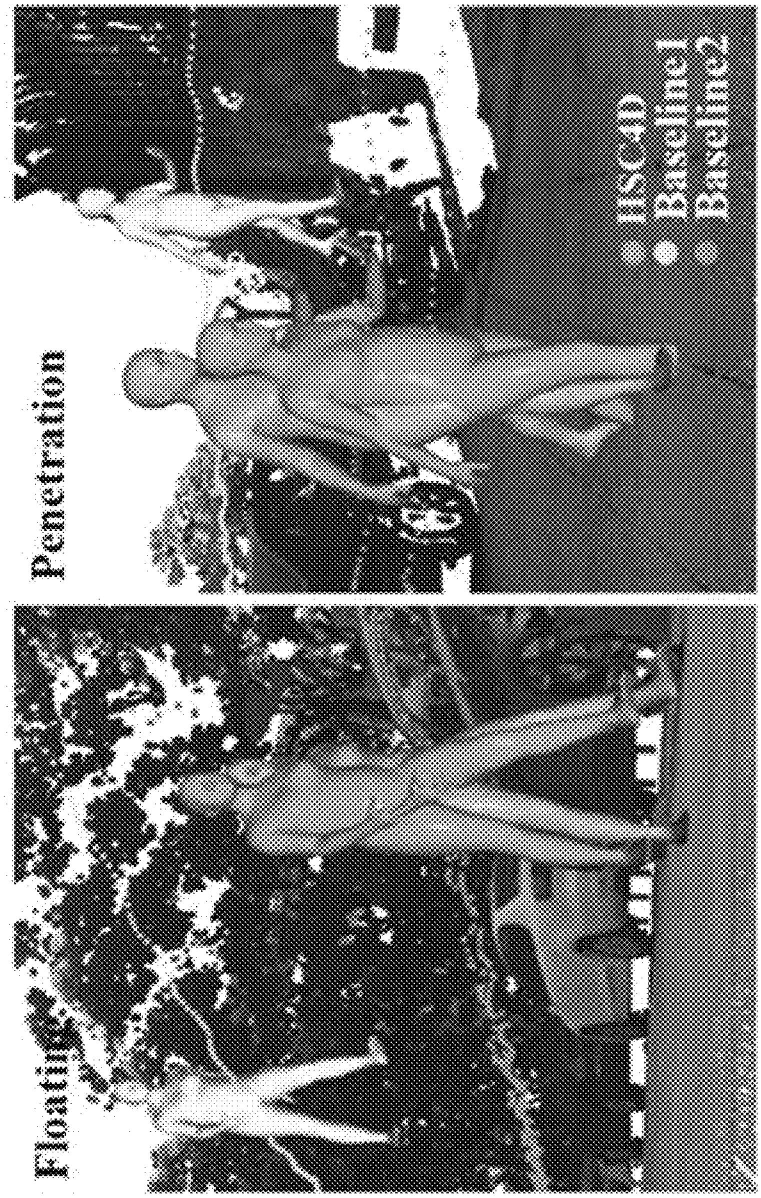
FIG. 3F illustrates a graphical comparison the HSC4D dataset with Baseline1 and Baseline2, according to various embodiments of the present disclosure.

As can be seen from these tables, when compared to the HPS dataset, which uses IMU sensors to estimate 3D human poses and a head-mounted camera for localization in large scenes. The HSC4D dataset achieves more accurate localization. In this regard, the HSC4D dataset is generated using IMU sensors with a hip-mounted LiDAR rather than a camera. Further, and more importantly, the HSC4D dataset does not acquire pre-built maps with the assistance of a LiDAR sensor, which allows a capturing system to directly capture scenes without any constraint. As table 362 shows, the HSC4D dataset can extend capturing scenarios to multi-story buildings and vertical routes, which covers more human motions and interactions with environments. As table 366 shows, as a distance increases in a scene, an error increases linearly in all methods. errors of Baseline1 are ten times larger compared to other methods because IMU drifts over time. Baseline2 has a smaller global localization error, but its accumulative errors still vary from 8 cm to 90 cm. The last column shows that the HSC4D dataset achieves the smallest global localization errors in the multi-story building and the road with slopes. More specifically, the HSC4D dataset improves 78.3% accuracy compared to Baseline1 and 25.4% compared to Baseline2. This improvement is illustrated in FIG. 3F. FIG. 3F illustrates a graphical comparison the HSC4D dataset with Baseline1 and Baseline2, according to various embodiments of the present disclosure. In FIG. 3F, colorful spheres represent IMU and LiDAR trajectories. As can be seen from FIG. 3F, the HSC4D dataset results are natural and accurate in both cases. For example, Baseline1 and Baseline2 are floating in the air in the left figure and Baseline1 is floating in the air and Baseline2's lower leg penetrates the ground in the right figure. As table 368 shows, Baseline1's foot contact loss is much larger than other methods especially in scenes where height change. Baseline2's $\mathcal{L}_{sld}$ is the largest among all methods. In the first three sequences where Baseline1 is not drift over height, Baseline2's $\mathcal{L}_{cont}$ is much larger than Baseline1. These cases indicate that LiDAR increases local errors. As can be seen from the last column, the HSC4D dataset significantly decreases $\mathcal{L}_{cont}$ in all cases and achieve comparable smoothness on $\mathcal{L}_{sld}$ compared to Baseline1. These comparisons reveal that the HSC4D dataset can achieve smooth results in local pose and is robust in various height diversity scenes.

Figure 4A:
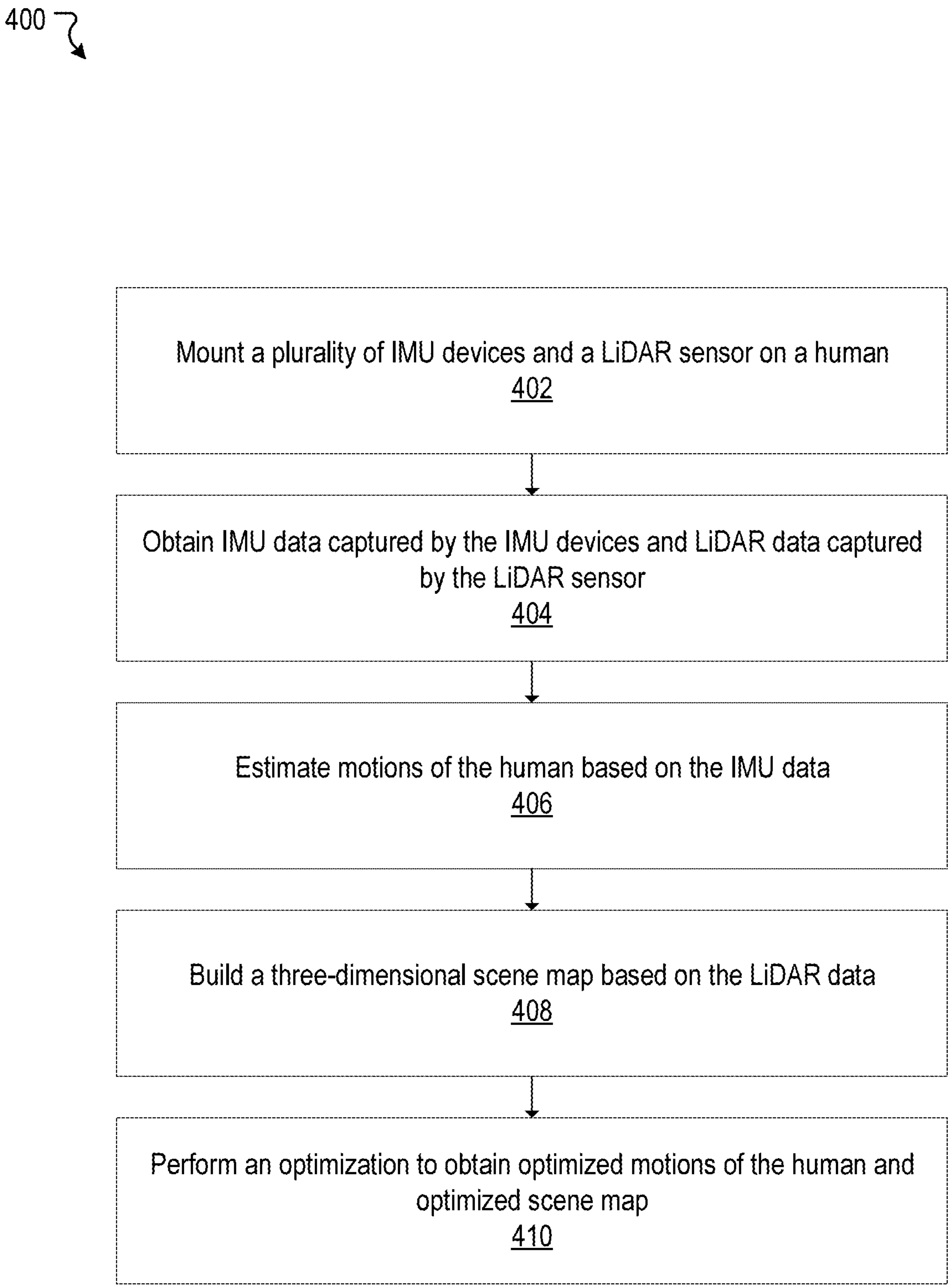
FIG. 4A illustrates a method for capturing motions of humans in a scene, according to various embodiments of the present disclosure.

FIG. 4A illustrates a method for capturing motions of humans in a scene, according to various embodiments of the present disclosure. It should be appreciated that there can be additional, fewer, or alternative steps performed in similar or alternative orders, or in parallel, within the scope of the various embodiments discussed herein unless otherwise stated.

At block 402, a plurality of IMU devices and a LiDAR sensor can be mounted on a human. In some embodiments, ego-motions of the LiDAR sensor can be estimated. The LiDAR sensor can be mounted on a hip of the human.

At block 404, IMU data captured by the IMU devices and LiDAR data captured by the LiDAR sensor can be obtained. In some embodiments, the LiDAR data and the IMU data can be calibrated based on the ego-motion of the LiDAR sensor. In some embodiments, the LiDAR data and the IMU data can be synchronized based on a peak derived from the LiDAR data and a peak derived from the IMU data. The peaks are determined when the human jumps during data capture.

At block 406, motions of the human can be estimated based on the IMU data.

At block 408, a three-dimensional scene map can be built based on the LiDAR data.

At block 410, an optimization can be performed to obtain optimized motion of the human and optimized scene map. In some embodiments, a graph-based optimization can be performed to fuse an LiDAR trajectory and an IMU trajectory. The LiDAR trajectory can comprise a movement of a center of the human derived from the LiDAR data and the IMU trajectory can comprise a movement of a center of the human derived from the IMU data. In some embodiments, the optimization can be based on a contact constraint and a sliding constraint. The contact constraint can define a contact loss as a distance from a body part derived from the motions of the human to a nearest surface derived from the three-dimensional scene map. The sliding constraint can define a sliding loss as a distance between two successive body parts derived from the motions of the human. In some embodiments, a sum of the contact loss and the sliding loss can be minimized with a gradient descent algorithm to iteratively optimize the motions of the human.

Figure 4B:
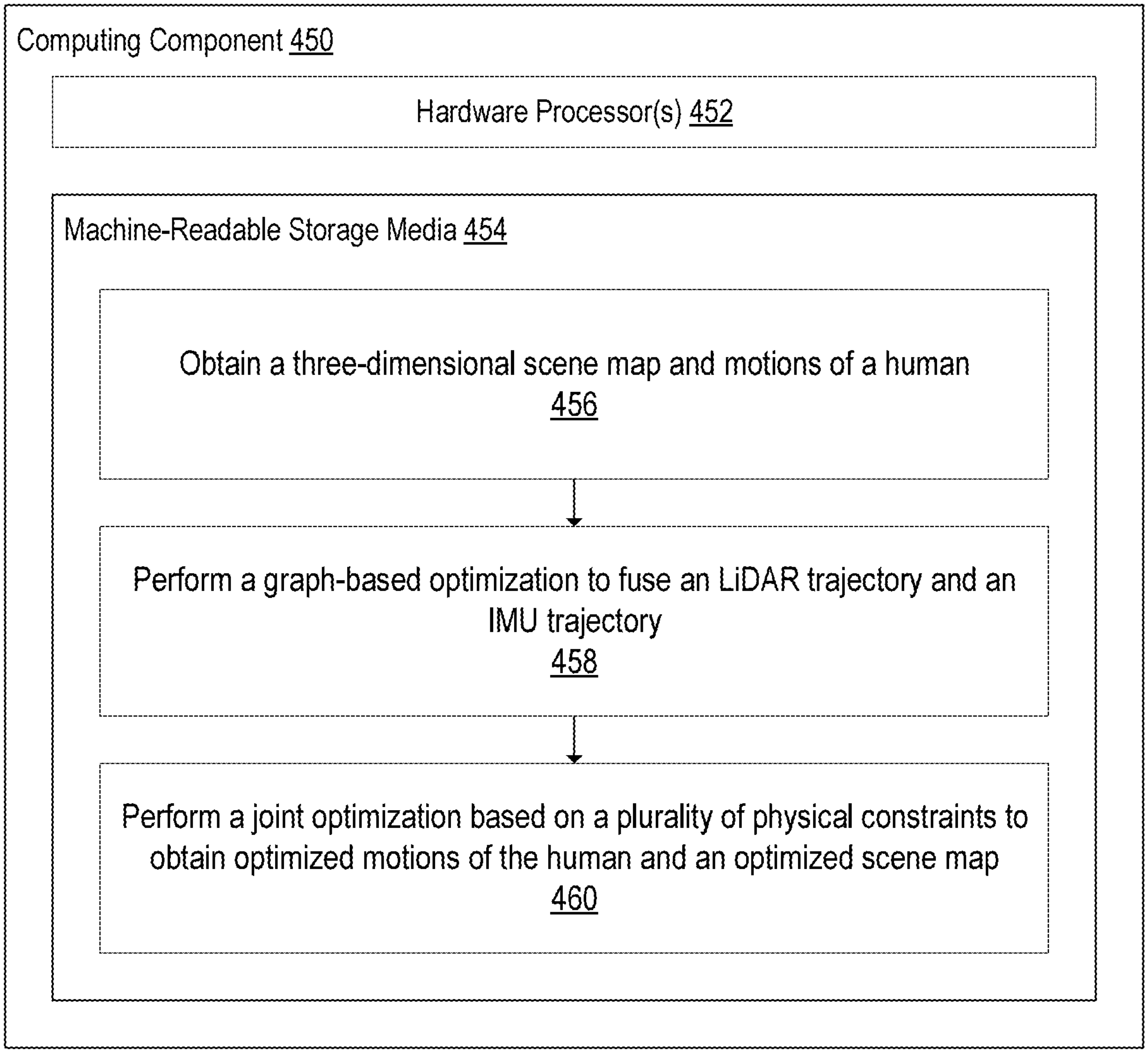
FIG. 4B illustrates a computing component that includes one or more hardware processors and a machine-readable storage media storing a set of machine-readable/machine-executable instructions that, when executed, cause the hardware processor(s) to perform a method for optimizing motions of humans in a scene, according to various embodiments of the present disclosure.

FIG. 4B illustrates a computing component 450 that includes one or more hardware processors 452 and a machine-readable storage media 454 storing a set of machine-readable/machine-executable instructions that, when executed, cause the hardware processor(s) 452 to perform a method for optimizing motions of humans in a scene, according to various embodiments of the present disclosure. The computing component 450 may be, for example, the computing system 500 of FIG. 5. The hardware processors 452 may include, for example, the processor(s) 504 of FIG. 5 or any other processing unit described herein. The machine-readable storage media 454 may include the main memory 506, the read-only memory (ROM) 508, the storage 510 of FIG. 5, and/or any other suitable machine-readable storage media described herein.

At block 456, a three-dimensional scene map and motions of a human can be obtained. In some embodiments, the three-dimensional scene map can be obtained from LiDAR data captured by a LiDAR sensor mounted on the human, and the motions of the human can be obtained from IMU data captured by a plurality of IMU devices mounted on the human.

At block 458, a graph-based optimization can be performed to fuse an LiDAR trajectory and an IMU trajectory. In some embodiments, the LiDAR trajectory can comprise a movement of a center of the human derived from the LiDAR data, and the IMU trajectory can comprise a movement of a center of the human derived from the IMU data.

At block 460, a joint optimization can be performed. based on a plurality of physical constraints to obtain optimized motions of the human and an optimized scene map. In some embodiments, the joint optimization can based on a contact constraint and a sliding constraint. The contact constraint can define a contact loss as a distance from a body part derived from the motions of the human to a nearest surface derived from the three-dimensional scene map, and the sliding constraint can define a sliding loss as a distance between two successive body parts derived from the motions of the human.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 5:
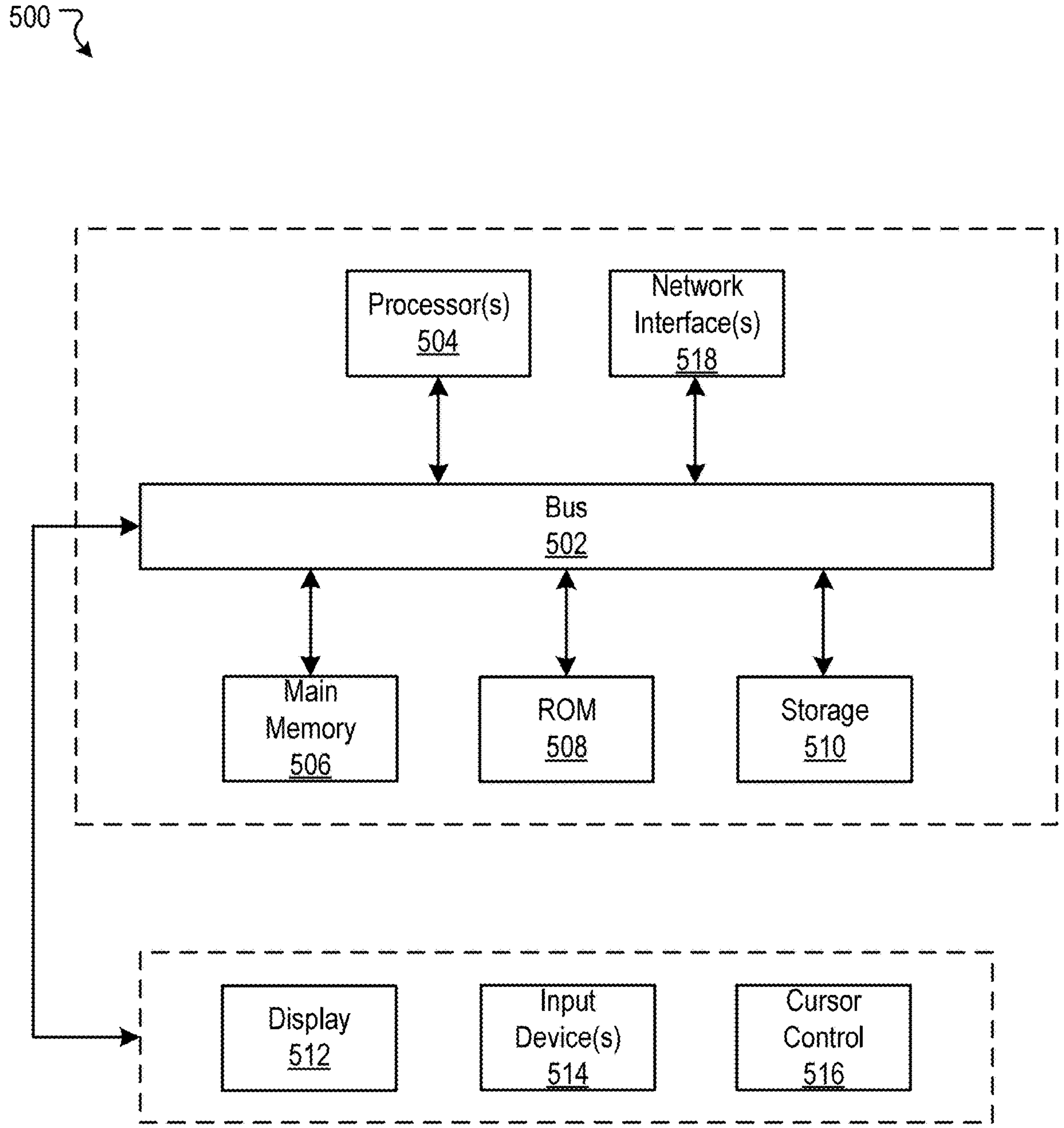
FIG. 5 illustrates a block diagram of a computer system upon which any of various embodiments described herein may be implemented.

FIG. 5 is a block diagram that illustrates a computer system 500 upon which any of various embodiments described herein may be implemented. The computer system 500 includes a bus 502 or other communication mechanism for communicating information, one or more hardware processors 504 coupled with bus 502 for processing information. A description that a device performs a task is intended to mean that one or more of the hardware processor(s) 504 performs.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to output device(s) 512, such as a cathode ray tube (CRT) or LCD display (or touch screen), for displaying information to a computer user. Input device(s) 514, including alphanumeric and other keys, are coupled to bus 502 for communicating information and command selections to processor 504. Another type of user input device is cursor control 516. The computer system 500 also includes a communication interface 518 coupled to bus 502.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as another component, and/or comprising same or similar features, characteristics, and parameters as another component.

What we claim is:

1. A method for capturing motions of humans in a scene, the method comprising:

mounting a plurality of IMU devices and a LiDAR sensor on a body part of a human;

obtaining IMU data captured by the IMU devices and LiDAR data captured by the LiDAR sensor;

estimating motions of the human based on the IMU data and the LiDAR data by aligning a LiDAR coordinate system of the LiDAR data and an IMU coordinate system of the IMU data, wherein the estimating the motions of the human comprises:

calibrating rigid offsets between the LiDAR coordinate system and the IMU coordinate system;

estimating motion of the LiDAR sensor from the LiDAR data to obtain a LiDAR trajectory;

aligning the LiDAR trajectory to the IMU coordinate system using the calibrated rigid offsets; and estimating the motions of the human based on the IMU data and the LiDAR trajectory aligned to the IMU coordinate system;

building a three-dimensional scene map based on the LiDAR data; and performing a joint optimization to obtain optimized motions of the human and optimized scene map.

2. The method of claim 1, further comprising:

jumping by the human during the step of obtaining IMU data captured by the IMU devices and the LiDAR data captured by the LiDAR sensor; and synchronizing the LiDAR data and the IMU data based on a peak derived from the LiDAR data and a peak derived from the IMU data.

3. The method of claim 1, further comprising:

performing a graph-based optimization to fuse an LiDAR trajectory and an IMU trajectory, wherein the LiDAR trajectory comprises a movement of a center of the human derived from the LiDAR data, and the IMU trajectory comprises a movement of a center of the human derived from the IMU data.

4. The method of claim 1, wherein the joint optimization is based on a contact constraint and a sliding constraint.

5. The method of claim 4, wherein the contact constraint defines a contact loss as a distance from the body part derived from the motions of the human to a nearest surface derived from the three-dimensional scene map, and the sliding constraint defines a sliding loss as a distance between two successive body parts derived from the motions of the human, and the method further comprises:

minimizing a sum of the contact loss and the sliding loss with a gradient descent algorithm to iteratively optimize the motions of the human.

6. The method of claim 5, wherein the body part is a foot of the human, and the surface is a ground.

7. The method of claim 1, further comprising:

mounting a plurality of second IMU devices and a second LiDAR sensor on a second human;

obtaining second IMU data captured by the second IMU devices and second LiDAR data captured by the second LiDAR sensor;

estimating motions of the second human based on the second IMU data;

building a three-dimensional second scene map based on the second LiDAR data;

fusing the three-dimensional scene map and the three-dimensional second scene map to obtain a combined scene map; and performing an optimization to obtain optimized motions of the human and the second human in an optimized combined scene map.

8. The method of claim 1, further comprising:

creating a metaverse based on the optimized motions of the human and the optimized scene map.

9. A system for capturing motions comprising:

a plurality of IMU devices to be worn by a human;

a LiDAR sensor to be mounted on a body part of the human;

a processor; and a memory storing instructions that, when executed by the processor, cause the system to perform a method for capturing motions of humans in a scene comprising:

obtaining IMU data captured by the IMU devices and LiDAR data captured by the LiDAR sensor; and estimating motions of the human based on the IMU data and the LiDAR data by aligning a LiDAR coordinate system of the LiDAR data and an IMU coordinate system of the IMU data, wherein the estimating the motions of the human comprises:

calibrating rigid offsets between the LiDAR coordinate system and the IMU coordinate system;

estimating motion of the LiDAR sensor from the LiDAR data to obtain a LiDAR trajectory;

aligning the LiDAR trajectory to the IMU coordinate system using the calibrated rigid offsets; and estimating the motions of the human based on the IMU data and the LiDAR trajectory aligned to the IMU coordinate system.

10. The system of claim 9, further comprising: a L-shaped bracket configured to mount the LiDAR sensor on a hip of the human, wherein the LiDAR sensor and the IMU devices are configured to have a rigid transformation.

11. The system of claim 9, further comprising:

a wireless receiver coupled to the system, wherein the wireless receiver is configured to receive the IMU data captured by the IMU devices.

12. The system of claim 9, wherein the instructions, when executed, further cause the system to perform:

building a three-dimensional scene map based on the LiDAR data; and performing an optimization to obtain optimized motions of the human and an optimized scene map.

13. The system of claim 12, wherein the instructions, when executed, further causes the system to perform:

perform a graph-based optimization to fuse an LiDAR trajectory and an IMU trajectory, wherein the LiDAR trajectory comprises a movement of a center of the human derived from the LiDAR data, and the IMU trajectory comprises a movement of a center of the human derived from the IMU data.

14. The system of claim 12, wherein the optimization is based on a contact constraint and a sliding constraint.

15. The system of claim 14, wherein the contact constraint defines a contact loss as a distance from the body part derived from the motions of the human to a nearest surface derived from the three-dimensional scene map, and the sliding constraint defines a sliding loss as a distance between two successive body parts derived from the motions of the human, and the method further comprises:

minimizing a sum of the contact loss and the sliding loss with a gradient descent algorithm to iteratively optimize the motions of the human.

16. The system of claim 15, wherein the body part is a foot of the human, and the surface is a ground.

17. The system of claim 12, wherein the method further comprises:

creating a metaverse based on the optimized motions of the human and the optimized scene map.

18. The system of claim 9, further comprising:

a plurality of second IMU devices configured to be worn by a second human;

a second LiDAR sensor configured to be mounted on the second human;

wherein the method further comprises:

obtaining second IMU data captured by the second IMU devices and second LiDAR data captured by the second LiDAR sensor;

estimating motions of the second human based on the second IMU data;

building a three-dimensional second scene map based on the second LiDAR data;

fusing the three-dimensional scene map and the three-dimensional second scene map to obtain a combined scene map; and performing an optimization to obtain optimized motions of the human and the second human in an optimized combined scene map.

19. A method of optimizing motions of humans in a scene, the method comprising:

obtaining a three-dimensional scene map and motions of a human, wherein the three-dimensional scene map is obtained based on LiDAR data captured by a LiDAR sensor mounted on a body part of the human, and the motions of the human are obtained based on IMU data and the LiDAR data by aligning a LiDAR coordinate system of the LiDAR data and an IMU coordinate system of the IMU data, wherein obtaining the motions of the humans comprises:

calibrating rigid offsets between the LiDAR coordinate system and the IMU coordinate system;

estimating motion of the LiDAR sensor from the LiDAR data to obtain a LiDAR trajectory;

aligning the LiDAR trajectory to the IMU coordinate system using the calibrated rigid offsets; and estimating the motions of the human based on the IMU data and the LiDAR trajectory aligned to the IMU coordinate system;

performing a graph-based optimization to fuse an LiDAR trajectory and an IMU trajectory; and performing a joint optimization based on a plurality of physical constraints to obtain optimized motions of the human and an optimized scene map.

20. The method of claim 19, further comprising:

calibrating the three-dimensional scene map and the motions of the human.

21. The method of claim 19, further comprising:

synchronizing the three-dimensional scene map and the motion of the human.

22. The method of claim 19, wherein the LiDAR trajectory comprises a movement of a center of the human derived from the LiDAR data, and the IMU trajectory comprises a movement of a center of the human derived from the IMU data.

23. The method of claim 19, wherein the joint optimization is based on a contact constraint and a sliding constraint.

24. The method of claim 23, wherein the contact constraint defines a contact loss as a distance from the body part derived from the motions of the human to a nearest surface derived from the three-dimensional scene map, and the sliding constraint defines a sliding loss as a distance between two successive body parts derived from the motions of the human, and the method further comprises:

minimizing a sum of the contact loss and the sliding loss with a gradient descent algorithm to iteratively optimize the motions of the human.

25. The method of claim 24, wherein the body part is a foot of the human, and the surface is a ground.

26. The method of claim 19, further comprising:

mounting a plurality of second IMU devices and a second LiDAR sensor on a second human;

obtaining second IMU data captured by the second IMU devices and second LiDAR data captured by the second LiDAR sensor;

estimating motions of the second human based on the second IMU data;

building a three-dimensional second scene map based on the second LiDAR data;

fusing the three-dimensional scene map and the three-dimensional second scene map to obtain a combined scene map; and performing an optimization to obtain optimized motions of the human and the second human in an optimized combined scene map.

27. The method of claim 19, further comprising:

creating a metaverse based on the optimized motions of the human and the optimized scene map.

* * * * *